(12) United States Patent
Pecone

(10) Patent No.: US 6,839,788 B2
(45) Date of Patent: Jan. 4, 2005

(54) BUS ZONING IN A CHANNEL INDEPENDENT STORAGE CONTROLLER ARCHITECTURE

(75) Inventor: Victor Key Pecone, Lyons, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 519 days.

(21) Appl. No.: 09/967,027

(22) Filed: Sep. 28, 2001

(65) Prior Publication Data

US 2003/0065841 A1 Apr. 3, 2003

(51) Int. Cl.[7] ............... G06F 13/00; G06F 13/40; G06F 12/00
(52) U.S. Cl. ............... 710/305; 710/300; 710/306; 714/25; 711/100; 711/141; 370/402
(58) Field of Search ............... 710/305, 307, 710/316, 300, 317, 22, 306, 313; 709/213, 229, 253; 714/5–7, 25; 370/381, 351, 362, 431, 401, 402, 388; 702/184, 185; 711/100, 112, 18, 141, 148; 712/28, 29; 307/112, 115; 340/825; 379/272, 291

(56) References Cited

U.S. PATENT DOCUMENTS

| | | | | |
|---|---|---|---|---|
| 5,345,565 A | * | 9/1994 | Jibbe et al. | 710/316 |
| 5,530,842 A | * | 6/1996 | Abraham et al. | 709/221 |
| 5,668,956 A | * | 9/1997 | Okazawa et al. | 710/306 |
| 6,243,829 B1 | * | 6/2001 | Chan | 714/7 |
| 6,272,533 B1 | * | 8/2001 | Browne | 709/213 |
| 6,507,581 B1 | * | 1/2003 | Sgammato | 370/381 |

OTHER PUBLICATIONS

"A high I/O reconfigurable crossbar switch" by Young, S.; Alfke, P.; Fewer, C.; McMillan, S.; Blodget, B.; Levi, D. abstract only.*

"Activity–sensitive architectural power analysis" by Landman, P.E.; Rabaey, J.M. (abstract only).*

* cited by examiner

Primary Examiner—Gopal C. Ray
(74) Attorney, Agent, or Firm—Sheridan Ross P.C.

(57) ABSTRACT

A network storage controller for transferring data between a host computer and a storage device, such as a redundant array of inexpensive disks (RAID), described. The network storage controller includes at least one channel interface module which is adapted to be connected to the host computer and storage device. The network storage controller also includes at least one controller memory module, attached to a passive backplane. The controller memory module communicates with the channel interface module. In applications where redundancy is required, at least two controller memory modules and at least two channel interface modules are used. The controller memory modules may mirror data between one another using the passive backplane and a shared communication path on the channel interface modules.

24 Claims, 11 Drawing Sheets

US 6,839,788 B2

BUS ZONING IN A CHANNEL INDEPENDENT STORAGE CONTROLLER ARCHITECTURE

FIELD OF THE INVENTION

The present invention is related to network storage controllers, and in particular, to a network storage controller utilizing redundant modular components with the data processing functions independent of the I/O interface.

BACKGROUND OF THE INVENTION

Network storage controllers are typically used to connect a host computer system with peripheral storage devices, such as disk drives or tape drives. The network storage controller acts as an interface between the host computer and the peripheral storage devices. In many applications, the network storage controller performs processing functions on the data transferred between the host computer and peripheral devices. One common application of such a system is a Redundant Array of Independant Disks (RAID). A RAID system stores data on multiple disk drives to protect the data against disk drive failure. If one disk drive fails, then the RAID system is generally able to reconstruct the data which was stored on the failed drive from the remaining drives in the array. A RAID system uses a network storage controller, which in many cases includes a RAID controller, an interface between the host computer and the array of disk drives.

Many applications require a storage system to have very high availability. This high availability is a key concern in many applications, such as financial institutions and airline reservations systems, because the users rely heavily on the data stored on the RAID system. In these type of applications, unavailability of data stored on the RAID system can result in significant loss of revenue and/or customer satisfaction. Employing a RAID system in such an application enhances availability of the stored data, since if a single disk drive fails, data may still be stored and retrieved from the system. In addition to the use of a RAID system, it is common to use redundant RAID controllers to further enhance the availability of a storage system. In such a situation, two or more controllers are used in a RAID system, with each controller having failover capability, where if one of the controllers fails the other remaining controller will assume operations for the failed controller. Such a platform enhances the availability of a RAID system, however, it can lead to several disadvantages, as will be discussed below.

FIG. 1 shows a block diagram representation of a common current-day dual controller configured RAID network storage controller 10, showing a fiber channel to fiber channel connection. That is, in this example, the host computer and the array of disk drives both communicate with the network storage bridge using fiber channel connections. While fiber channel is a common channel medium is such systems, it should be understood that other channels may also be used, such as, for example, Small Computer System Interface (SCSI) or Ethernet. The RAID system shown in FIG. 1 includes two host ports, host port-1 14 and host port-2 18 and two disk ports, disk port-1 22 and disk port-2 26. Each host port 14, 18 may be associated with different host computers, and each disk port 22, 26 may be associated with different disk arrays, as is common in RAID systems and is well known in the art. The network storage bridge 10 includes dual RAID controllers, controller-A 30, and controller-B 34. In a system employing zoning of controllers, controller-A 30 may be zoned to host port-1 14 and disk port-1 22, and controller-B 34 may be zoned to host port-2 18 and disk port-2 26.

As is understood in the art, systems which employ dual controllers with write back caching require data mirroring between controllers to maintain cache coherency. Each controller 30, 34, must have a copy of the data and status of the other controller in order to maintain redundancy between the controllers and thus maintain operation of the RAID system if one controller fails. Mirroring data between controllers can decrease the performance of a RAID system because transferring data between controllers uses processing resources of the controllers, as well as channel bandwidth, as will be discussed in more detail below.

The controllers 30, 34 are connected to a fiber channel backplane 38, which is connected to two IO modules, IO module-1 42, and IO module-2 46. Each controller 30, 34, includes a CPU subsystem 50, a memory 54 (e.g., double data rate), control logic 58, a dual port fiber channel connection with two host ports 62a, 62b and a dual port fiber channel connection with two disk ports 66a, 66b. The CPU subsystem 50 performs tasks required for storage of data onto an array of disks, including striping data, and initiating and executing read and write commands. The memory 54 is a nonvolatile storage area for data and other information. The control logic 58 performs several functions, such as interfacing with the CPU subsystem 50, memory 54, and the host ports 62a, 62b and the disk ports 66a, 66b. The control logic 58 may also have other functions, including a parity generation function, such as an exclusive OR (XOR) engine. The host ports 62a, 62b and disk ports 66a, 66b provide communications with the fiber channel backplane 38. The IO modules 42, 46 include link resiliency circuits (LRCs) 70, also known as port bypass circuits, which function to connect each host port 14, 18 and each disk port 22, 26 to each controller 30, 34. This allows both controllers 30, 34 to have access to both host ports 14, 18 and both disk ports 22, 26.

In order to provide full redundancy, each controller must have a connection to each host port 14, 18 and each disk port 22, 26. This way, if there is a failure of one of the controllers, the other controller can continue operations. As mentioned above, it is common for each host port 14, 18 to be associated with different host computers, and for each disk port 22, 26 to be associated with different disk arrays. In these cases, each controller 30, 34 is typically associated with one disk port and one host port, which helps to enhance the performance of a RAID system. However, in such a case, half of these ports are passive. For example, if controller-A 30 is associated with host port-1 14 and disk port-1 22, then controller-A 30 receives all communications from host port-1 14 and controls the disk array(s) on disk port-1 22. Likewise, controller-B 34 would be associated with host port-2 18 and disk port-2 26. These techniques are well known in the art and can increase performance of the RAID system as well as simplify control and communications of the two controllers 30, 34. In the example of FIG. 1, on controller-A 30 the host port connection 62a and disk port connection 66a are connected to host port-1 14 and disk port-1 22, respectively, through the LRCs 70 of IO module-1 42. Because controller-A 30 is associated with host port-1 14 and disk port-1 22, the host port connection 62a and disk port connection 66a actively communicate with host port-1 14 and disk port-1 22. The remaining host port connection 62b and disk port connection 66b are connected to host port-1 18 and disk port-2 26, respectively, through the LRCs 70 of IO module-2 46. These connections are typically passive connections, as controller-A 30 is not actively communicating with host port-2 18 and disk port-2 26, so long as controller-B 34 does not fail. Likewise, controller-B 34 would be associated with host port-2 18 and disk port-2 26. Thus, for controller-B 34, the host port connection 62*b* and disk port connection 66*b* would communicate with host port-2 18 and disk port-2 26 through LRCs 70 of IO module-2 46. The remaining host port connection 62*a* and disk port connection 66*a* would be connected to host port-1 14 and disk port-1 22 through LRCs 70 of IO module-1 42.

As mentioned above, in typical redundant controller operations with write back caching data is mirrored between controllers. When mirroring data between controller-A 30 and controller-B 34, it is common to transfer the mirrored data over the disk port connections. For example, controller-B 34 may receive data over host port-2 18 that is to be written to an array of drives over disk port-2. Controller-B 34 would receive this data and store it in memory 54. In order to maintain cache coherency, controller-B 34 must also communicate this data to controller-A 30, thus both controllers have the data, and if one fails the other is still able to write the data. In a traditional system, this transfer of data is accomplished over several steps. First, controller-B 34 sends the data over the disk port connection 66*a* which connects to the LRC 70 connected to disk port-1 22. The data would transfer to the associated hardware on disk port-1 22 and be transferred back to the LRC 70, where it would then be received at the disk port connection 66*a* on controller-A. Controller-A would then store the data in memory 54, providing a copy of the data that was originally sent to controller-B 34. Controller-B 34 would then perform the appropriate steps to write the data to the disk array. Once the data is written to the disk array, controller-B 34 then communicates this to controller-A 30 using the same communication path as described above, and controller-A 30 then removes the record of the data write. Likewise, if controller-A 30 receives data to be written to the array of disks on disk port-1 22, it sends the data to controller-B 34 using the same mirroring technique.

While this technique may use the remaining disk port on each controller, the second host port on each controller remains unused, thus passive, during normal operation of the system. The passive ports on each controller adds a significant amount of hardware to the controller, and can add significant cost to the network storage controller 10. Thus, it would be advantageous to provide a redundant network storage controller which maintains high availability while reducing cost and hardware associated with passive ports located on the controllers.

Additionally, mirroring data in such a system results in the mirrored data and storage data being sent over the same port for the controller that is receiving the mirrored data. Bandwidth to and from the disk array is consumed by the mirrored data, which can reduce the performance of the network storage bridge. Additionally, when mirroring data, processing resources within the controllers 30, 34 are consumed, because the controller sending the data has to put it into form to be transferred over the disk port, and the controller receiving the data must process the data received over the disk port. For example, in the fiber channel embodiment shown in FIG. 1, mirrored data is formatted pursuant to fiber channel protocol, which can require several interrupts and processing resources. Thus, it would be advantageous to have a network storage controller which consumes little or no channel bandwidth when mirroring data between controllers. It would also be advantageous to have a network storage controller which consumes less processing resources for mirroring data.

Furthermore, with the continual increasing of demand for data storage, RAID controllers often require upgrades with additional disk drives or faster bus interfaces. However, a RAID controller may not be configured to add additional bus interface capacity or may not support a new type of bus interface. Such controllers commonly have to be replaced when an upgrade is performed. This replacement of controllers can increase the cost of upgrading a RAID system. The replacement of an operational RAID controller represents a loss in value that may inhibit the decision to upgrade a RAID system. Thus, it would be advantageous to have a system which can support upgrades of capacity, as well as new interface types, with ease and reduced cost.

Accordingly, there is a need to develop an apparatus and method for use in a network storage controller which: (1) provides redundancy with reduced cost for passive components, (2) reduces the amount of mirrored data which is sent over the disk or host ports, (3) reduces the processing overhead involved with mirroring data, and (4) provides easily replaceable and upgradeable components.

SUMMARY OF THE INVENTION

In accordance with the present invention, an apparatus and method are provided involving connection of a host computer with at least one storage device. The apparatus includes a passive backplane having a number of data buses, including a first data bus and a second data bus. The apparatus includes at least two channel interface modules, which are connected to the passive backplane, the host computer and the storage devices. The channel interface modules are operable to send and receive storage data to and from the host computer and the storage devices, and selectively transfer the storage data to the data buses. The apparatus also includes at least two controller memory modules, which are connected to the passive backplane and communicate with the channel interface modules via the passive backplane, and which store and process the storage data transferred to and from the channel interface modules.

The first channel interface module has a first switched path and a second switched path, in which the first switched path is enabled to connect the first switched path to the first controller memory module using the passive backplane, and the second switched path to the second controller memory module using the passive backplane is disabled. The second switched path is enabled and the first switched path is disabled when a failure of the first controller memory module is detected using the second controller memory module.

The channel interface modules include a communication path portion and a channel interface portion. The channel interface portion is operable to transfer the storage data between the host computer and/or the storage devices and the communication path portion. The communication path portion is operable to selectively transfer data between the channel interface portion and the passive backplane. In one embodiment, the first channel interface module includes a first bus port and a second bus port, and the second channel interface module includes a third bus port and a fourth bus port, with each of the bus ports being operable to connect the communication path portion to the passive backplane.

The controller memory modules include a bus interface portion that connects to the passive backplane, a memory for temporary storage of the storage data, and a processing portion that organizes and arranges the storage data. The bus interface portion includes at least one backplane interface that connects to the passive backplane, a memory interface that connects to the memory, a processing portion that connects to the processing portion, a bridge core that contains control logic operable to connect the processing interface, memory interface and backplane interface. The bus interface portion may also include an exclusive OR (XOR) engine that performs XOR function on data blocks. In one embodiment, the bus interface portion also includes a direct memory access (DMA) engine that provides a DMA connection to the passive backplane. In another embodiment, the first controller memory module includes a first bus interface and a second bus interface, and the second controller memory module includes a third bus interface and a fourth bus interface, with each bus interface being operable to connect the bus interface portion to the passive backplane.

The passive backplane contains at least first and second data buses, and in one embodiment also contains third and fourth data buses. The data buses on the passive backplane may be next generation peripheral component interconnect (PCIX) buses. In one embodiment, the first bus port is connected to the first data bus and the second bus port is connected to the third data bus. The third bus port is connected to the second data bus, and the fourth bus port is connected to the fourth data bus. The first bus interface is connected to the first data bus, and the second bus interface is connected to the second data bus. The third bus interface is connected to the third data bus and the fourth bus interface is connected to the fourth data bus.

The communication path portion of the first channel interface module may have a first shared path, a first switched path and a second switched path, and the communication path portion of the second channel interface module may have a second shared path, a third switched path and a fourth switched path. In this embodiment, the first shared path is connected to the first bus port and the second bus port. The first switched path is connected to the first bus port and the channel interface portion. The second switched path is connected to the second bus port and the channel interface portion. The second shared path is connected to the third bus port and the fourth bus port. The third switched path is connected to the third bus port and the channel interface portion. The fourth switched path is connected to the fourth bus port and the channel interface portion. Each switched path is operable to enable and disable communications involving the channel interface portion.

A method for zoning a controller memory module to a channel interface module is also provided. The method includes providing a first channel interface module having a first switched path and a second switched path. The first switched path is connected to a first controller memory module using a passive backplane and the second switched path is connected to a second controller memory module using the passive backplane. The first switched path is then enabled, and the second switched path is disabled. The method also includes providing a second channel interface module having a third switched path and a fourth switched path. The third switched path is connected to the first controller memory module using the passive backplane and the fourth switched path is connected to the second controller memory module using the passive backplane. The fourth switched path is enabled, and the third switched path is disabled. In one embodiment, the first controller memory module is operable to detect a failure of the second controller memory module, and the second controller memory module is operable to detect a failure of the first controller memory module. When the first controller memory module detects a failure of the second controller memory module, use of the second controller memory module is discontinued. The third switched path is enabled, and the fourth switched path is disabled.

A failure is detected, in one embodiment, when the first controller memory module monitors a heartbeat signal of the second controller memory module, and observes an irregularity in the heartbeat. A failure signal is then transmitted from the first controller memory module to the second controller memory module. The second controller memory module receives the failure signal, and discontinues operation. Likewise, the second controller memory module monitors a heartbeat signal of the first controller memory module, and upon detection of a failure incapacitates the first controller memory module, enables the second switched path and disables the first switched path.

In another embodiment, the first controller memory module detects a failure of the first channel interface module. Upon detection of the failure, the first controller memory module incapacitates the first channel interface module and enables the third switched path. The first controller memory module then goes idle. During operation, the first channel interface module may performs run time diagnostics, the results of which are monitored by the first controller memory module for any irregularities. Upon detection of a failure, the first controller memory module transmits a failure signal to the first channel interface module. The first channel interface module receives the failure signal, and discontinues operation.

DETAILED DESCRIPTION

Figure 1:
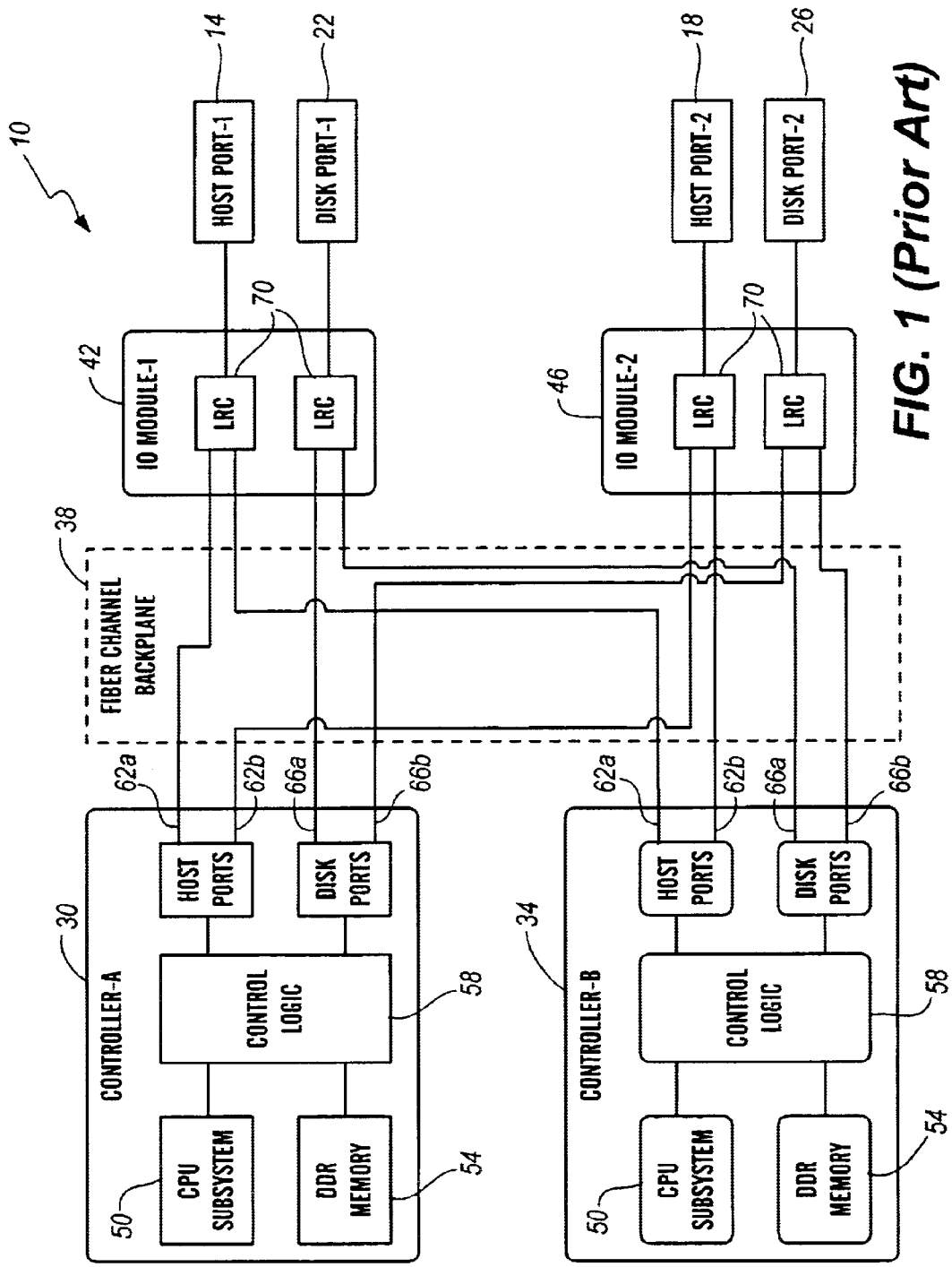
FIG. 1 is a block diagram representation of a conventional dual controller network storage bridge.
Figure 2:
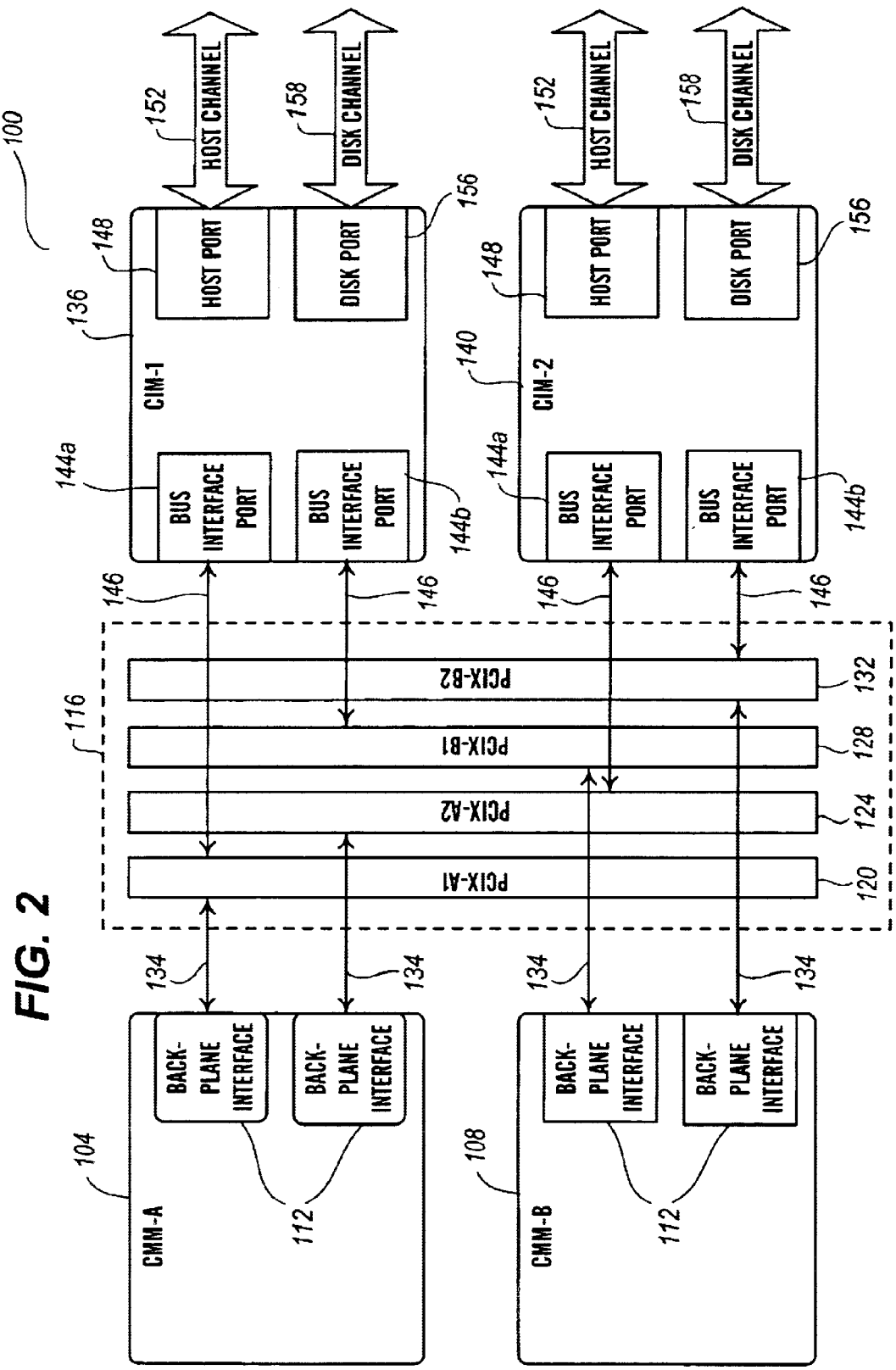
FIG. 2 is a block diagram representation of a network storage apparatus of the present invention.

With reference now to FIG. 2, a block diagram of the network bridge 100 of the present invention is shown. The network bridge 100 includes one or more controller memory modules (CMMs). In the embodiment shown in FIG. 2, there are two CMMs, CMM-A 104, and CMM-B 108, although a single CMM may be used in applications where no redundancy is required, and additional CMMs may be used in applications requiring additional redundancy or higher performance. Each CMM 104, 108 has two backplane interfaces 112. The system has a passive bus backplane 116, which has two buses for each CMM. In the embodiment shown, the passive bus backplane 116 uses next generation Peripheral Component Interconnect (PCIX) buses, although it will be understood that any bus technology may be used, including switched architectures such as Infiniband or RapidIO, as well as traditional bus architectures such as PCI local bus. The passive bus backplane 116 can have a first data bus 120, a second data bus 124, a third data bus 128, and a fourth data bus 132. The first data bus 120 and second data bus 124 connect to the backplane interfaces 112 on CMM-A 104 via CMM bus connections 134, and the third data bus 128 and fourth data bus 132 connect to the backplane interfaces 112 on CMM-B 108 via CMM bus connections 134.

In the embodiment shown in FIG. 2, PCIX buses are used in the passive backplane 116. The use of PCIX buses allows relatively high performance bus interconnection components connected to the passive backplane 116 with well understood and relatively simple bus protocol. PCIX technology is a next generation technology which leverages the traditional PCI bus. PCIX technology enables systems and devices that can operate at bus frequencies of up to 133 MHZ using 64-bit or 32-bit bus width and having a bandwidth of up to 1066 Mb/s with 64-bit, 133 MHZ PCIX bus. The PCIX bus employs a register-to-register protocol, which eases timing constraints associated with high frequency traditional PCI bus, and allows higher frequency operation of the PCIX bus. In addition to the ability to increase bus frequency, the PCIX bus incorporates several technologies which enhance bus efficiency, including attribute phase, split transaction support, optimized wait states and standard block size movements.

The attribute phase uses a 36-bit attribute field that describes bus transactions in more detail than the conventional PCI specification allows. It follows immediately after the address phase and contains several bit assignments that include information about the size of the transaction, ordering of transactions, cache snooping requirements, and the identity of the transaction initiator. With a split transaction as supported in PCIX, the device requesting the data sends a signal to the target. The target device informs the requester that it has accepted the request. The requester is free to process other information until the target device initiates a new transaction and sends the data to the requester. Thus, split transactions enable more efficient use of the bus. Wait states are optimized in PCIX, which eliminates the use of wait states, used in traditional PCI bus protocol, except for initial target latency. When a PCIX device does not have data to transfer, it will remove itself from the bus so that another device can use the bus bandwidth. This provides more efficient use of bus and memory resources. With standard block size movements, adapters and bridges (host-to-PCIX and PCIX to PCIX) are permitted to disconnect transactions only on naturally aligned 128-byte boundaries. This encourages longer bursts and enables more efficient use of cache-line-based resources such as the processor bus and main memory. It also facilitates a more pipelined architecture within PCIX devices.

The network bridge 100 has one or more channel interface modules (CIMs). In the embodiment shown in FIG. 2, there are two CIMs, CIM-1 136 and CIM-2 140, although it will be understood that this number may vary depending upon the configuration and application in which the network bridge 100 is used. Each CIM 136, 140 has two CIM bus interface ports 144a, 144b. On each CIM 136, 140 one CIM bus interface port 144a connects to one bus which is connected to CMM-A 104, and one CIM bus interface port 144b connects to one bus which is connected to CMM-B 108 via CIM bus connections 146. In the embodiment shown in FIG. 2, CIM-1 136 connects to the first data bus 120 and third data bus 128, and CIM-2 140 connects to the second data bus 124 and fourth data bus 132. Each CIM 136, 140 has a host port 148, which connects to a host channel 152, which connects to a host computer (not shown). Each CIM 136, 140 also has a disk port 156, which connects to a disk channel 158, which connects to one or more storage devices (not shown). In alternative embodiments, as will be discussed in more detail below, a CIM may contain only host ports or only disk ports, depending upon the application and channel interface required.

When the host computer sends data, it is sent over the host channel 152 and is received at the host port 148 on the CIMs 136, 140. This data is sent to the CMMs 104, 108 via the passive backplane 116. The CMMs 104, 108 contain memory and processing units, as will be described in detail below, which arrange the data into an appropriate form for storage on the storage devices. For example, if the system is used in a RAID 5 disk array system, the CMMs 104, 108 will arrange the data into appropriate stripes of data to be written to the disks, and will compute a parity block for the stripe of data. Thus, the CMMs 104, 108 process the data and format it for storage. Once this is complete, the CMMs 104, 108 transfer the data, ready for storage, to the CIMs 136, 140 via the passive backplane 116. The CIMs 136, 140 then send the data to the storage devices connected to the disk port 156. As will be described in more detail below, data can be transferred between the CMMs 104, 108 using the CIMs 136, 140 and the passive backplane 116. Additionally, as will also be discussed below, the CMMs 104, 108 and CIMs 136, 140, maybe zoned to specific drives or hosts.

This configuration provides a modular and redundant architecture in which the host channel 152 and the disk channel 158 need not necessarily be the same channel medium. The modularity of the CMMs 104, 108 and CIMs 136, 140 also allows for relatively low cost upgrades and easy replacement of failed units. The use of a passive backplane 116 to exchange data between CMMs 104, 108 also avoids the use of channel bandwidth of the disk channel 158 or the host channel 152, as would be required for data mirroring in a traditional redundant controller environment, as will be discussed below.

Figure 3:
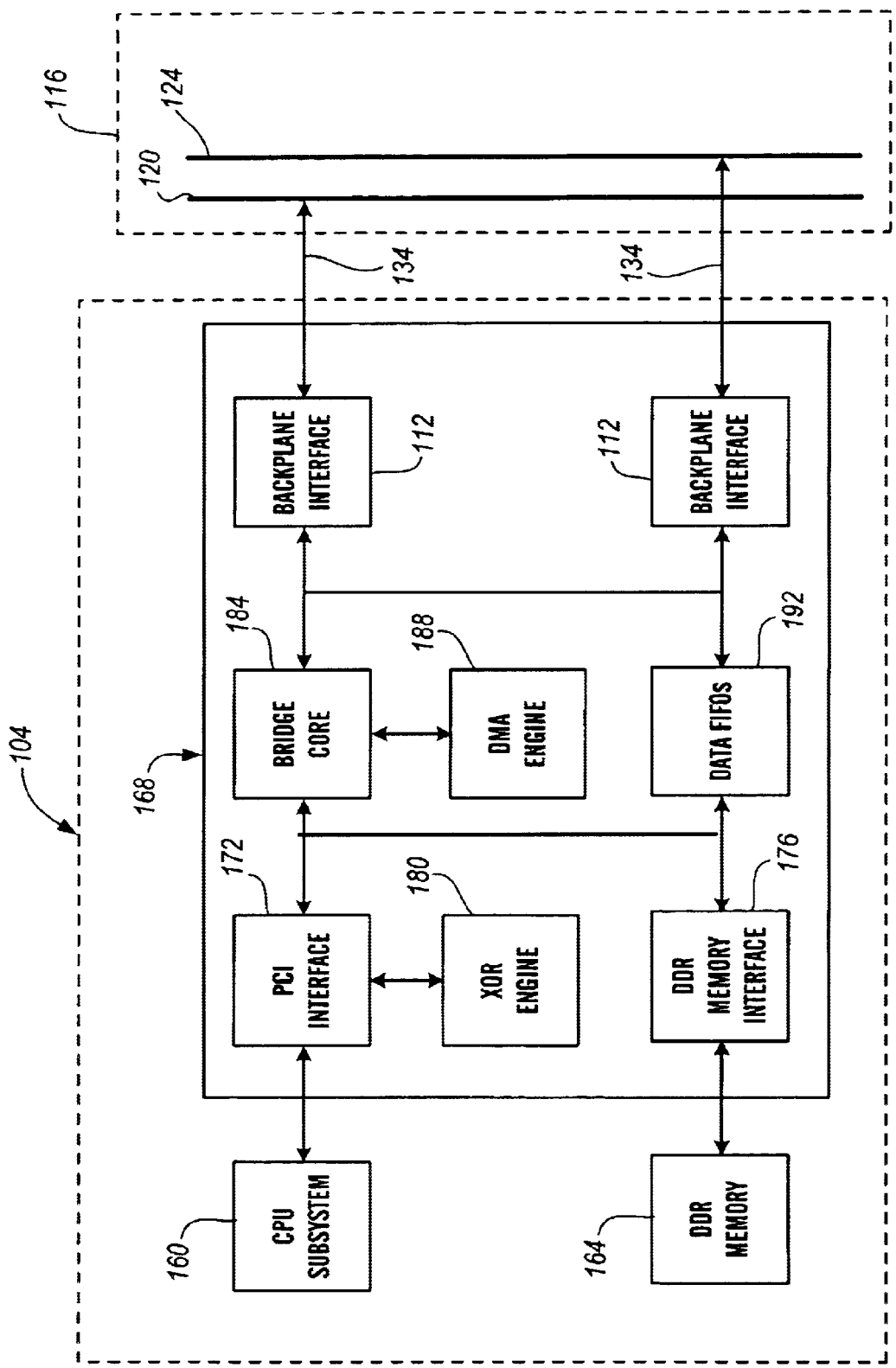
FIG. 3 is a block diagram representation of a controller memory module of the present invention.

With reference now to FIG. 3, a block diagram representation of a CMM 104 is shown. The CMM 104 contains several components, including a CPU subsystem 160, a memory 164, and an interface FPGA 168. The CPU subsystem 160 maybe a standard type CPU, such as a widely used microprocessor, or may be an application specific processor. In one embodiment, the CPU subsystem 160 is an Intel Pentium (TM) class microprocessor. The CPU subsystem 160 communicates with the interface FPGA 168 using a standard bus, such as a PCI bus. The memory 164 allows for temporary storage of data within the CMM 104. This storage is used during normal read and write operations for several purposes, such as storing queued data that is waiting to be written to the disk array. In one embodiment, a DDR memory DIMM is used, which communicates with the interface FPGA 168 using a bus interface.

The interface FPGA 168 contains a number of components. It will be understood that these components maybe combined into a single FPGA, or may exist on several components within the CMM 104. In one embodiment, shown in FIG. 3, the interface FPGA 168 includes a PCI interface 172, a memory interface 176, an XOR engine 180, a bridge core 184, a DMA engine 188, data FIFOs 192, and two backplane interfaces 112. The PCI interface 172, acts as an interface between the CPU subsystem 160 and the other portions of the interface FPGA 168. In the embodiment shown, this interface uses a standard PCI bus connection. The PCI interface 172 connects to a bridge core 184, which in turn connects to the backplane interfaces 112, which interface with the first data bus 120 and second data bus 124 located on the passive backplane 116.

The memory interface 176, acts as an interface between the memory 164 and the interface FPGA 168. The XOR engine 180 serves to perform XOR operations on the data to be stored, in order to obtain parity information on the data which is to be written. The XOR engine 180 is also used in situations where the use of parity information is required to recover data from a failed drive in a disk array. The XOR engine 180 connects to the CPU subsystem 160 through the PCI interface 172. The data FIFOs 192 connect to the memory interface 176 and bridge core 184, and in turn connect to the backplane interfaces 112. The data FIFOs serve as a queue which is used by the CMM 104 to manage read and write operations. The DMA engine 188 serves to provide and receive DMA data from another CMM when the CMMs are operating to provide redundancy, as will be discussed in detail below.

Figure 4:
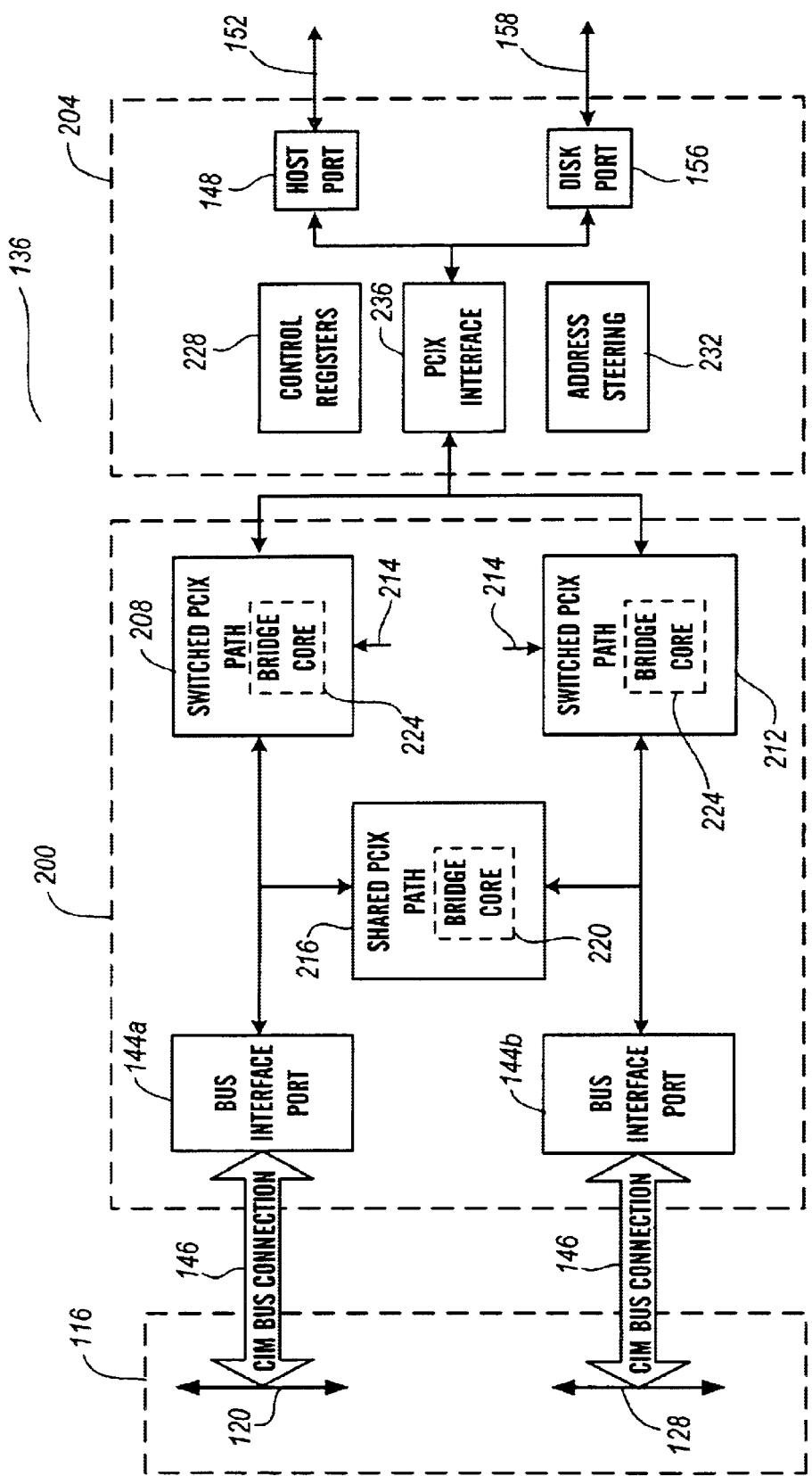
FIG. 4 is a block diagram representation of a channel interface module of the present invention.

Referring now to FIG. 4, a block diagram representation of a CIM 136 is shown. The CIM 136 contains a switched/shared PCIX FPGA 200, and a channel interface 204. The switched/shared PCIX FPGA 200 contains a first switched PCIX path 208, and a second switched PCIX path 212, and a shared PCIX path 216. Each switched PCIX path 208, 212 connects to a bus interface port 144, which in turn connects to a PCIX bus on the passive backplane 116 via a CIM bus connection 146. Each switched PCIX path 208, 212, also has an enable input 214. The enable input 214 is used to enable or disable the switched PCIX path 208, 212. The shared PCIX path 216 contains a bridge core 220, which determine which data is to be routed over the shared path 216, and passes that data through the shared path 216 and to the other CIM bus connection 146. Likewise, each of the switched PCIX paths 208, 212 also contain a bridge core 224, which determine which data is to be routed over the switched path 208, 212, and passes that data through to the channel interface 204.

The channel interface 204 connects the switched/shared PCIX FPGA 200 to the host channel 152 and the disk channel 158. The channel interface contains control registers 228, an address steering portion 232, a PCIX interface 236, a host port 148, and a disk port 156. The control registers 228 are used to control communications over the host channel 152 or disk channel 158. The address steering portion 232 is used to direct data to the proper addresses on either the host computer or the storage devices. The PCIX interface 236, functions to communicate data from the switched/shared PCIX FPGA 200, and communicate data to the host port 148, and the disk port 156. The PCIX interface 236 enables communication over the appropriate channel medium for the application. For example, if the host channel 152 and the disk channel 158 use fiber channel, the PCIX interface 236 would act as the interface between the switched/shared PCIX FPGA 200 and the fiber channel. Likewise, if the host channel 152 and the disk channel 158 use a SCSI channel, the PCIX interface 236 would act as the interface between the switched/shared PCIX FPGA 200 and the SCSI channel. If both the host channel 152 and the disk channel 158 use the same channel medium, the CIM 136 can use identical host ports 148 and disk ports 156 for communication with both the host channel 152 and the disk channel 158.

In one embodiment, the disk channel 158 and the host channel 152 do not use the same channel medium. In this embodiment, a different CIM is used for each different channel medium. For example, if the host computer used a fiber channel, and the disk array used a SCSI channel, the host computer would connect to one CIM, using a fiber channel interface, and the disk array would connect to another CIM, using a SCSI channel interface. If redundancy were required, two or more CIMs could be connected to each channel medium.

In the embodiment shown in FIG. 4, the first switched PCIX path 208 communicates with the first data bus 120 and the second switched PCIX path 212 communicates with the third data bus 128 through the bus interface port 144 and CIM bus connection 146. The shared PCIX path 216 maybe used as a communication path for one CMM to communicate with another CMM, as will be discussed in detail below. It will be understood that a similar configuration is used for the remaining CIMs that are present on the network bridge. For example, in the embodiment shown in FIG. 2, CIM-2 140 is connected to the second data bus 124 and the fourth data bus 132, and thus the switched/shared PCIX FPGA 200 contained in CIM-2 140 would have switched PCIX paths 208, 212 which communicate with the second data bus 124 and fourth data bus 132 respectively. Likewise, if more than two CIMs are present, they will be configured to communicate with the appropriate buses on the passive backplane 116 as required by the application.

Referring again to FIGS. 2–4, the enable input 214 is used to zone a CIM 136, 140, to a particular CMM 104, 108. In such a case, a CMM 104 or 108 has exclusive ownership of a CIM 136 or 140 by enabling access to that CIM 136 or 140 from the bus segment that the CMM 104 or 108 is connected to. For example, in one embodiment, CMM-A 104 is zoned to CIM-1 136, and CMM-B 108 is zoned to CIM-2 140. Thus, CMM-A 104 has exclusive ownership of CIM-1 136, and CMM-B 108 has exclusive ownership of CIM-2 140. This zoning is achieved by activating the enable input 214 on the first switched PCIX path 208 in CIM-1 136, and disabling the enable input 214 on the second switched PCIX path 212 in CIM-1 136. This results in only the first switched PCIX path 208 communicating with the channel interface 204. As mentioned above, in CIM-1 136, the first switched PCIX path 208 communicates with the first data bus, and therefore CMM-A 104 is zoned to CIM-1 136. Likewise, for the zoning of CIM-2 140 to CMM-B 108, the enable input 214 on the second switched path 212 is activated and the enable input on the first switched PCIX path 208 is not activated. This results in only the second switched PCIX path 212 in CIM-2 140 communicating with the channel interface 204, and therefore CMM-B 108 is zoned to CIM-2 140. By allowing only one CMM 104 or 108 to control a CIM 136 or 140, channel control, mapping and management are simplified. Zoning is particularly useful when two or more host channels or disk channels are present. For example, if two host channels are present and two disk channels are present, CMM-A 104 may be zoned to the first host channel and the first disk channel, and CMM-B 108 maybe zoned to the second host channel and the second disk channel. Thus, CMM-A 104 will send and receive data from the first host channel through CIM-1 136, and CMM-B 108 will send and receive data from the second host channel through CIM-2 140. The use of zoning in the CMMs simplifies control in an active-active application, because the CMMs do not have to perform coherency checks. A coherency check is required if zoning is not implemented, because both CMMs would own the same channel. In such a case, prior to performing any functions regarding data, such as a read or a write function, a CMM must verify that the other CMM has not performed any functions for that data. This coherency check can be complex to implement, and can degrade performance because of the additional overhead each CMM must perform.

Figure 5:
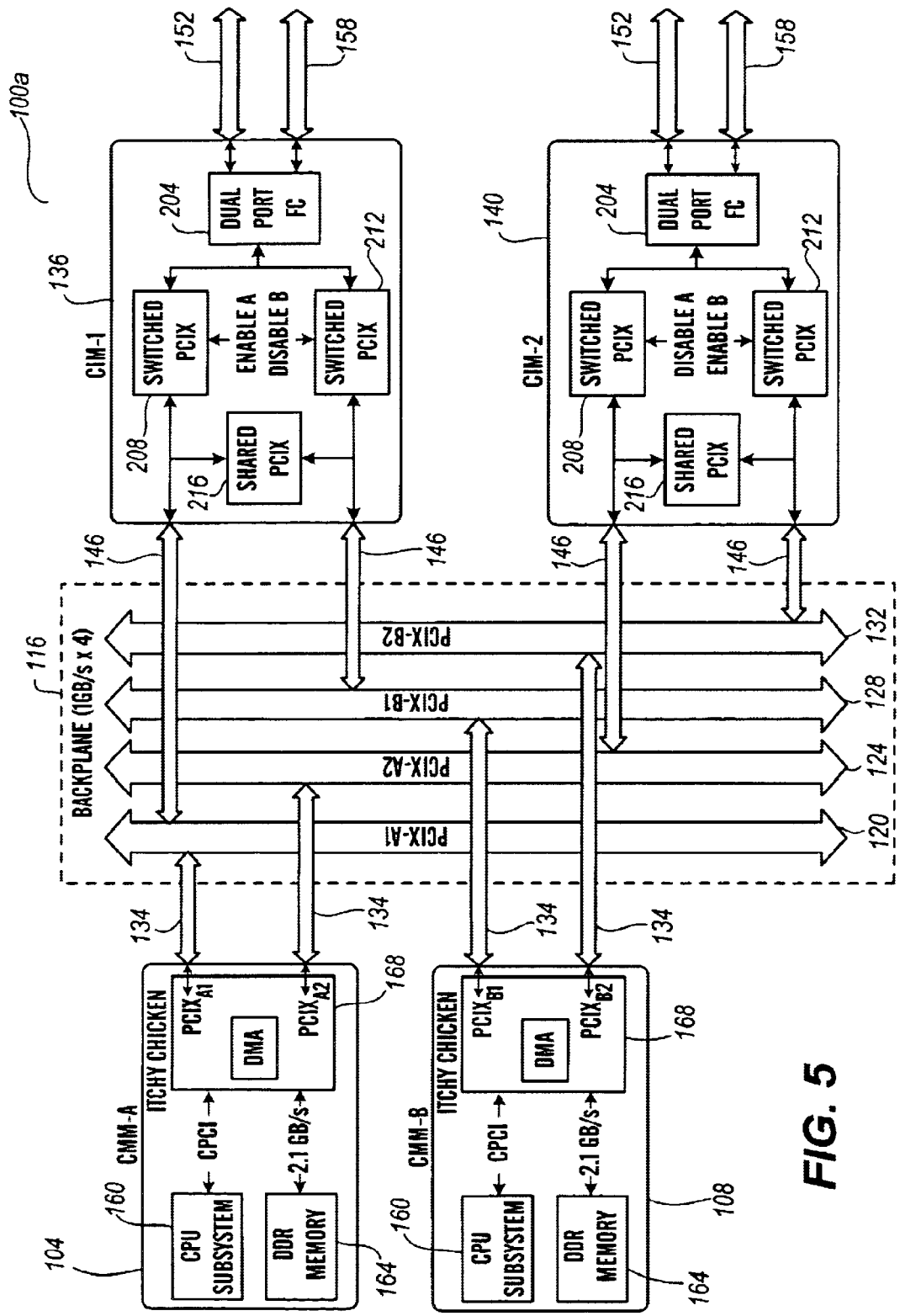
FIG. 5 is a block diagram representation of a redundant network storage bridge of the present invention.

With reference now to FIG. 5, a block diagram representation of a network bridge 100a containing redundant components is shown. In this embodiment, two CMMs are used, CMM-A 104 and CMM-B 108. Two CIMs are used, CIM-1 136 and CIM-2 140. CMM-A 104 and CIM-1 136 are both connected to the first data bus 120 in the passive backplane 116. CMM-A 104 and CIM-2 140 are both connected to the second data bus 124 in the passive backplane 116. CMM-B 108 and CIM-1 136 are both connected to the third data bus 128 on the passive backplane 116. CMM-B 108 and CIM-2 140 are both connected to the fourth data bus 132 on the passive backplane 116.

As will be understood by those of skill in the art, redundant controllers require mirroring of data between the two controllers attached to the storage subsystem. This is due to the use of a write back cache, where the controller receives data from the host computer, caches the data and sends a message to the host computer that the data has been written. Thus the host computer determines that the data has been written, when it is actually stored in the controller and is waiting there to be written to the drives in the disk array. To help ensure that this data is not lost in the event of a failure, redundant controllers mirror this data to the other controller, thus having another copy of the data on the other controller. This is known as cache coherency. In one embodiment, the CMMs 104, 108 mirror data to provide cache coherency to the network bridge 100a. This can be done by implementing a DMA path between CMM-A 104 and CMM-B 108. This can be accomplished by providing a DMA engine 188 in the interface FPGA 168, as discussed above with respect to FIG. 3, and a shared path 216 which is located in the switched/shared path FPGA 200, as discussed above with respect to FIG. 4. Each CMM 104, 108, uses this DMA path to send and receive data from the other CMM. By utilizing the DMA path, the two CMMs 104, 108 can mirror data without the need to use the host channel 152, or the disk channel 158, thus channel bandwidth in the disk channel 158 or host channel 152 is not consumed by the CMMs 104, 108 mirroring data. Additionally, by employing a DMA path between the two CMMs 104, 108, less processing resources are required from the CMMs 104, 108 to complete the mirroring than would be required to mirror using the host channel 152 or disk channel 158.

There is also a failover reset link 240 present between CMM-A 104 and CMM-B 108. The failover reset link 240 is used for communicating a failure of one of the CMMs 104, 108. In one embodiment, the failover reset link 204 is a serial connection between CMM-A 104 and CMM-B 108. In this embodiment, each CMM 104, 108 maintains a heartbeat signal which is communicated over the failover reset link 204, and monitored by the other CMM. If a problem is detected in the heartbeat signal, a CMM 104, 108 can send a signal over the failover reset link to terminate the operation of the other CMM. For example, if CMM-B 108 has a failure, CMM-A 104 will detect that the heartbeat signal from CMM-B 108 is no longer active. After a preset time period in which no heartbeat signal is received, CMM-A 104 sends a termination signal to CMM-B 108. When CMM-B 108 receives the termination signal, it discontinues operation. CMM-A then takes control of all read and write operations. Likewise, if CMM-A 104 failed CMM-B 108 would receive the indication over the failover reset link 240, and take control of all read and write operations. Thus, the system is redundant and continues to operate when a CMM 104 or 108 fails.

Figure 6:
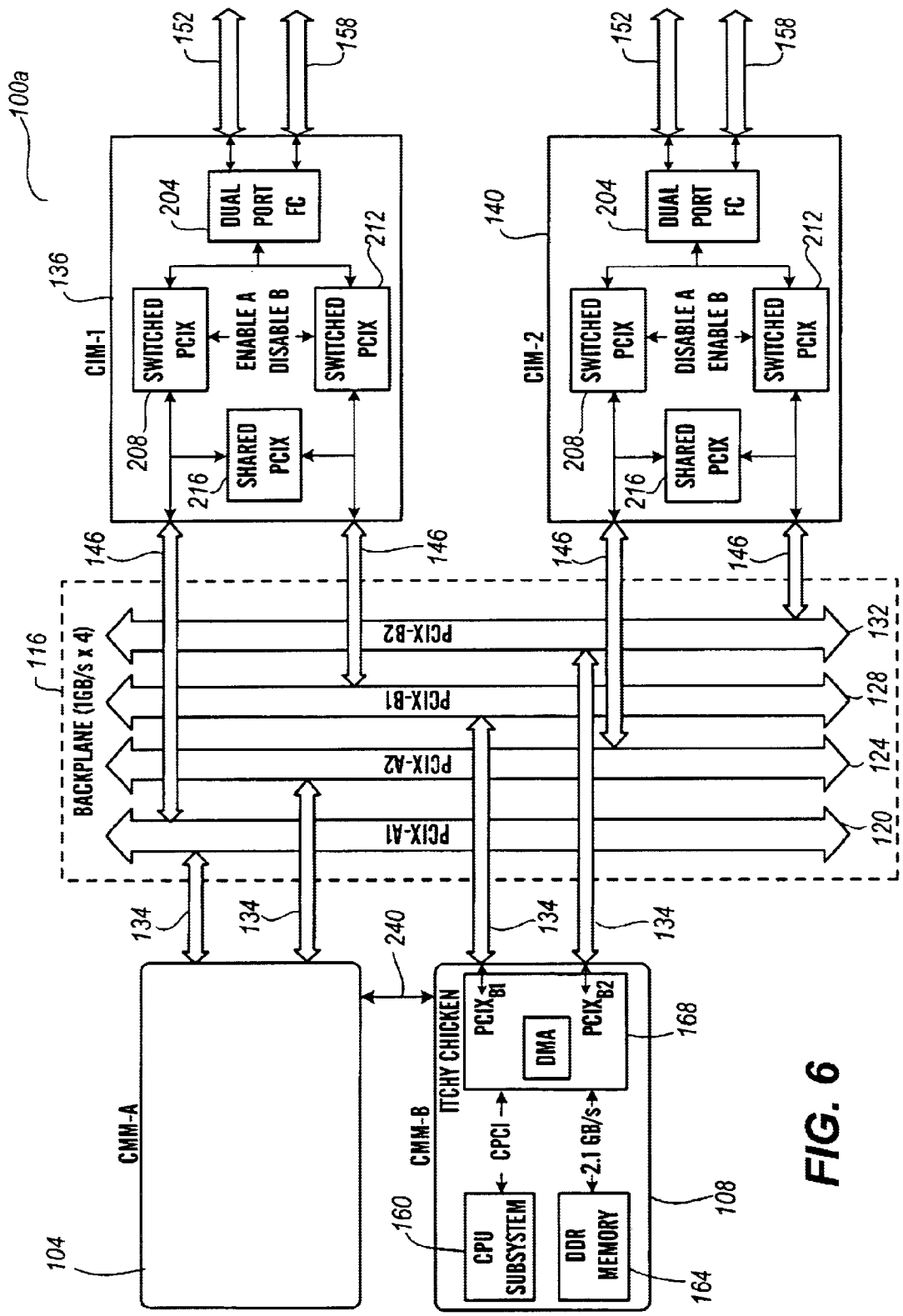
FIG. 6 is a block diagram representation of a redundant network storage bridge showing a failed controller memory module.

Referring now to FIG. 6, the operation of the system when a CMM fails will now be described. As shown in FIG. 6, the network bridge 100a has CMM-A 104 and CMM-B 108, a passive PCIX backplane 116, and a CIM-1 136 and a CIM-2 140. When CMM-A 104 fails, CMM-B 108 detects the failure over the failover reset link 240, as described above, and terminates operations on CMM-A 104. CMM-B 108 then assumes control of all memory and control operations formerly conducted by CMM-A 104. When this happens, CMM-B 108 sends a command to CIM-1 136 and CIM-2 140, to enable communications with CMM-B 108 only. In this case, CIM-1 136 would receive this command, and disable the first switched path 208 connected to the first data bus 120, and to enable the second switched path 212 connected to the third data bus 128, thereby connecting CMM-B 108 to the host port 148 and disk port 156 on CIM-1 136. CIM-2 140 also receives the command from CMM-B 108, and performs the same function to disable the first switched path 208 connected to the second databus 124, and to enable the second switched path 212 connected to the fourth data bus 132. In one embodiment, the passive backplane 116 contains control logic lines, which connect to the enable inputs 214 on the CIMs 136, 140, and are connected to the CMMs 104, 108. The CMMs 104, 108 can use these control logic lines to enable and to disable the switched paths 208, 212 on the CIMs 136, 140. Alternatively, other embodiments may be used to enable and disable the switched paths 208, 212, such as control logic within the CIM which receives command information via the PCIX buses on the passive backplane 116, for example.

Figure 7:
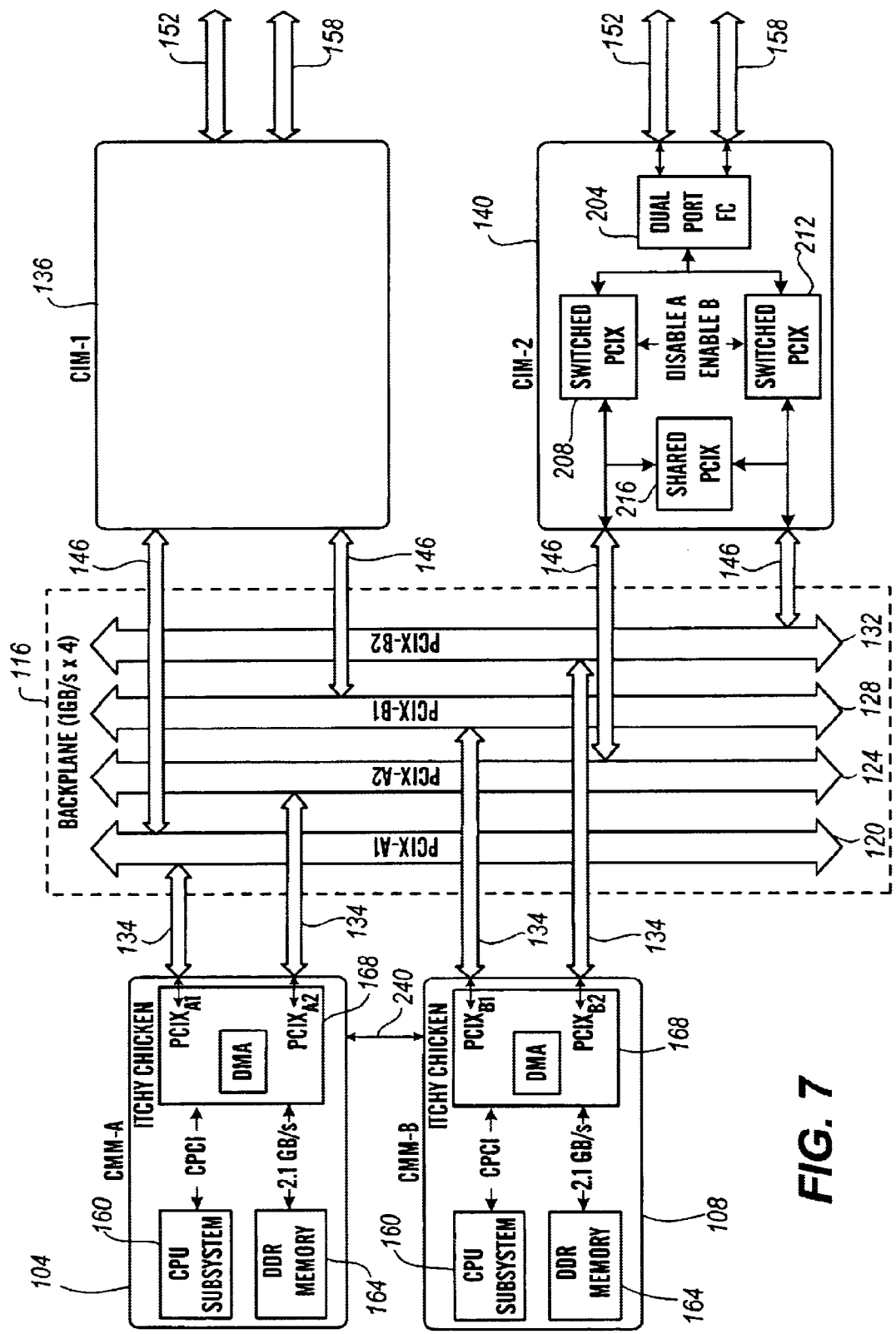
FIG. 7 is a block diagram representation of a redundant network storage bridge showing a failed channel interface module.

Referring now to FIG. 7, the operation of the system when a CIM fails will now be described. The CMMs 104, 108 periodically perform runtime diagnostics, which verify the proper operation of all components within the CIM 136, 140. The results of these runtime diagnostics are communicated to the CMMs 104, 108 via the control logic lines. The CMM 104, 108 that is zoned to a CIM 136, 140 monitors these runtime diagnostics, and in the event of an error or a failure, communicates a command over the control logic lines to terminate the operation of that CIM 136 or 140. As depicted in FIG. 7, CIM-1 136 has a failure. CMM-A 104 determines that CIM-1 136 has had a failure, and disables CIM-1 136. CMM-A 104 then communicates this information to CMM-B 108 via the shared path 216 on CIM-2 140. CMM-B 108 receives this information and assumes control of all communication between the host port 148 and disk port 156 on CIM-2 140. CMM-A 104 remains in a passive state until CIM-1 136 has been replaced, or the failure is corrected.

Figure 8:
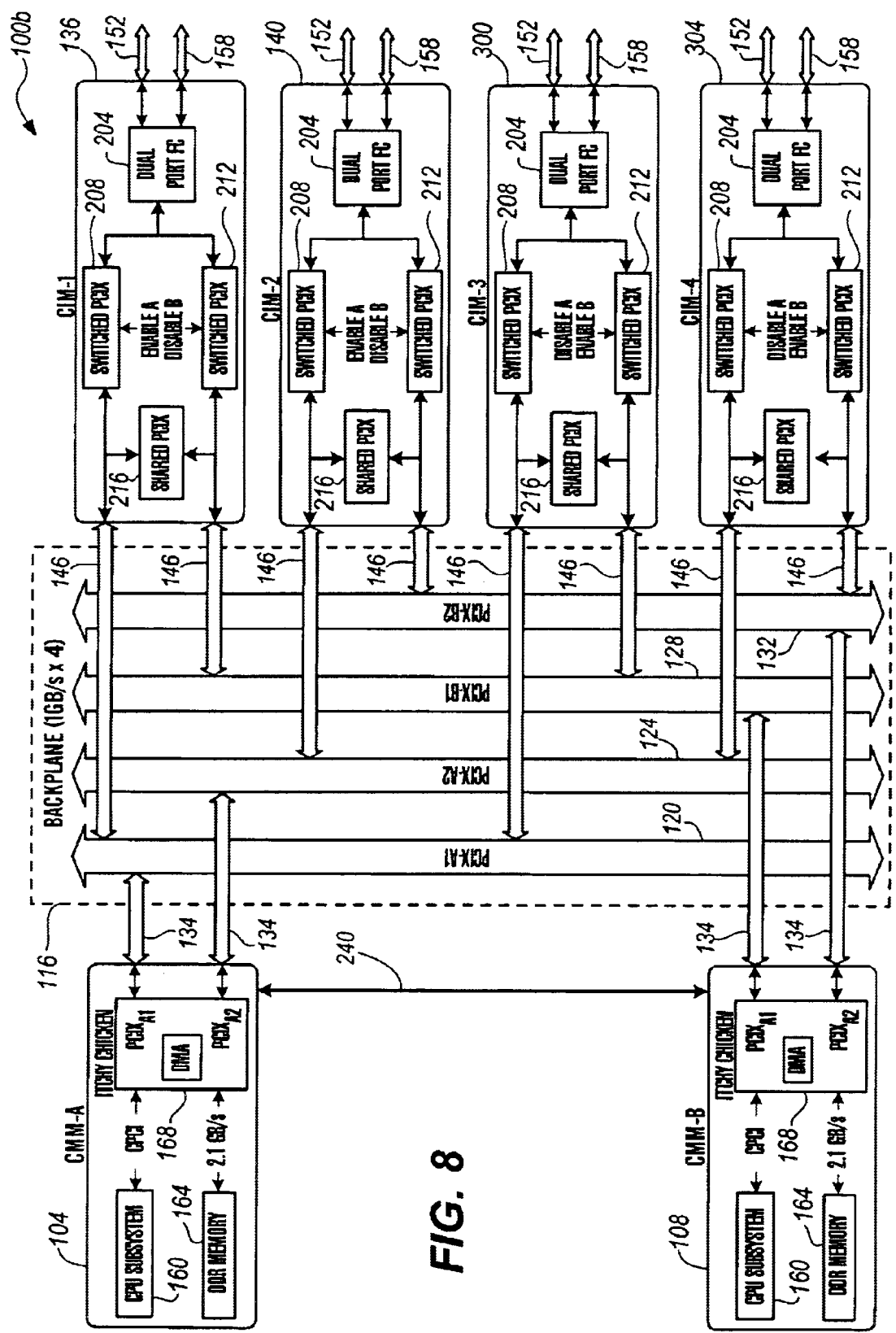
FIG. 8 is a block diagram representation of a redundant network storage bridge showing four channel interface modules.

Referring now to FIG. 8, a block diagram of a network bridge 100b is shown in which four-CIM modules are present. In this embodiment, two CMMs, CMM-A 104 and CMM-B 108, communicate to four CIMs, CIM-1 136, CIM-2 140, CIM-3 300, and CIM-4 304. In this embodiment, the CMM-A switched paths 208 on CIM-1 136 and CIM-2 140 are enabled. Likewise, in CIM-3 300 and CIM-4 304, the CMM-B switched paths 212 are enabled.

Thus, CIM-1 136 and CIM-2 140 provide the interface between CMM-A 104 and the host port 148 and the disk port 156, and CIM-3 300 and CIM-4 304 provide the interface between CMM-B 108 and the host port 148 and disk port 156. A network bridge of this embodiment is useful in several cases including, for example, when multiple hosts are present. In this embodiment, CIM-1 136 and CIM-2 140 provide communications to a first host, and CIM-3 300 and CIM-4 304 provide communications to a second host. The same arrangement can be done for multiple disk nodes, such as two separate RAID arrays. As will be understood, this configuration provides for a scalable system which can provide communications between one or more host nodes and one or more disk nodes, while also providing for redundant operation. Additionally, such an embodiment may be useful to connect hosts and/or disk arrays which use a different channel medium. For example, an existing system may have two CIMs and use fiber channel connections for both the host and disk channels. If a user wanted to upgrade the system to add another disk array which used a SCSI connection, additional CIMs could be added which enable communication with a SCSI channel, allowing the upgrade of the existing system without having to replace existing hardware.

Figure 9:
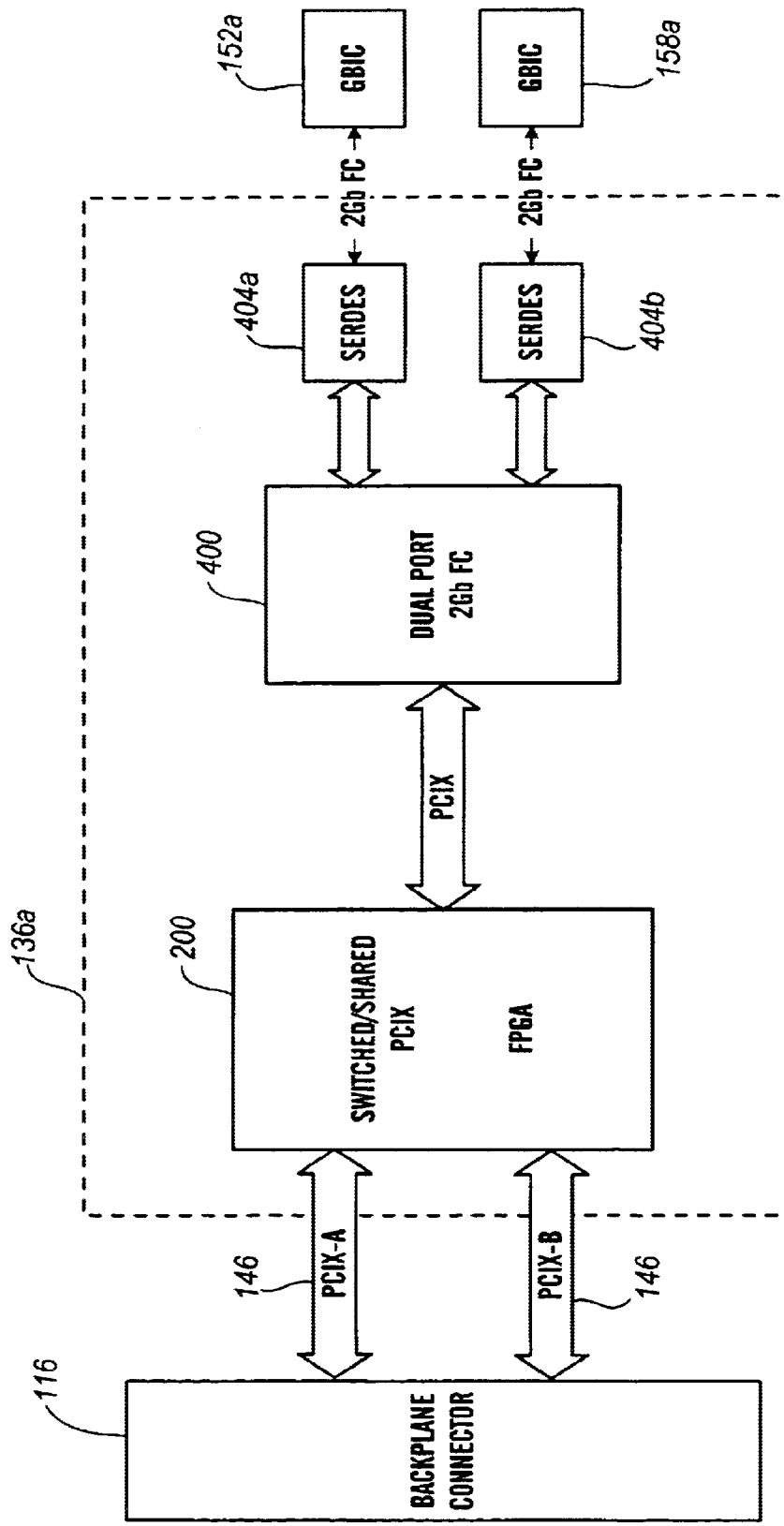
FIG. 9 is a block diagram representation of a network storage bridge utilizing a 2 GB fibre channel interconnect channel.
Figure 10:
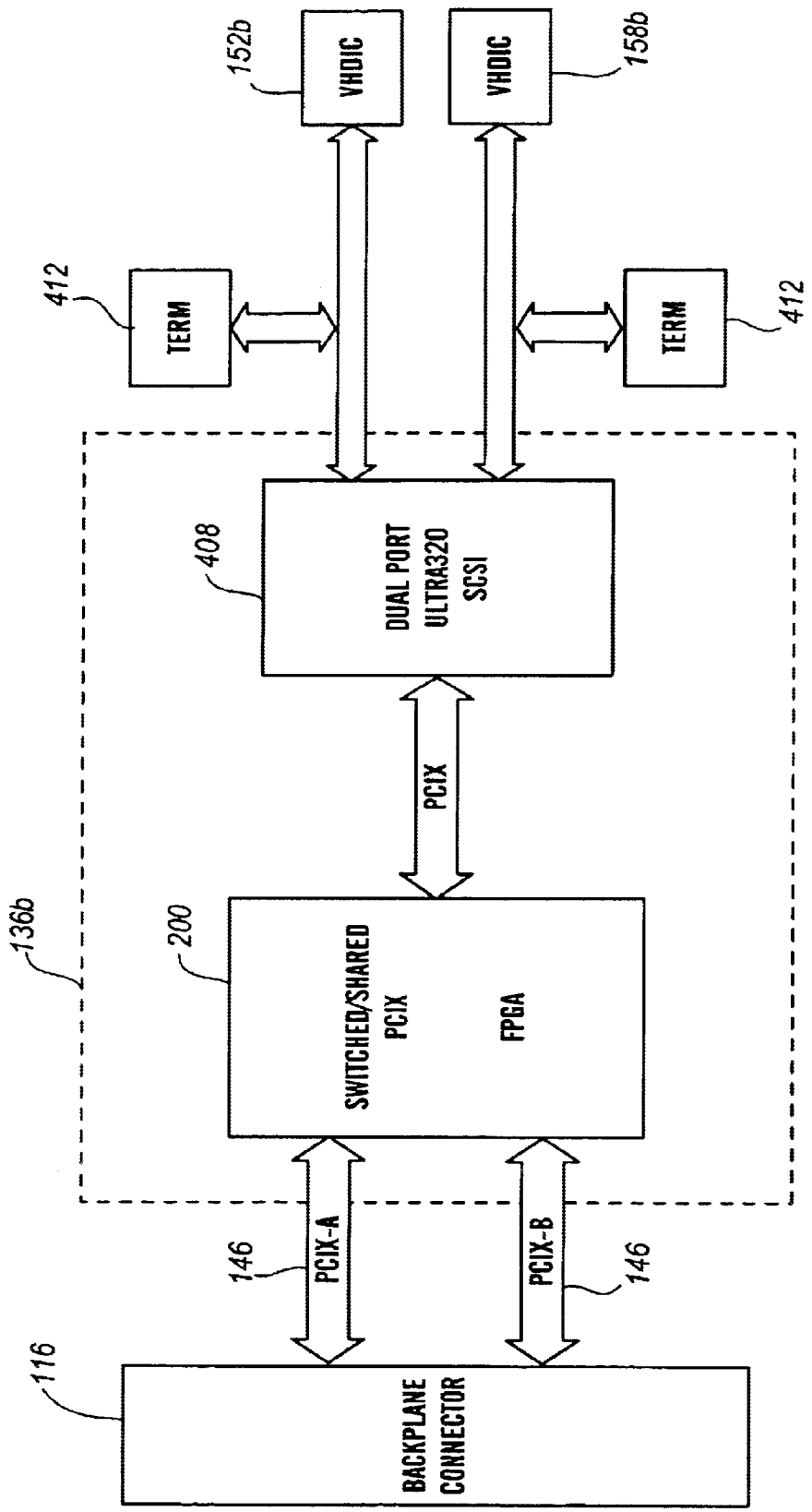
FIG. 10 is a block diagram representation of a network storage bridge utilizing an Ultra320 SCSI channel.
Figure 11:
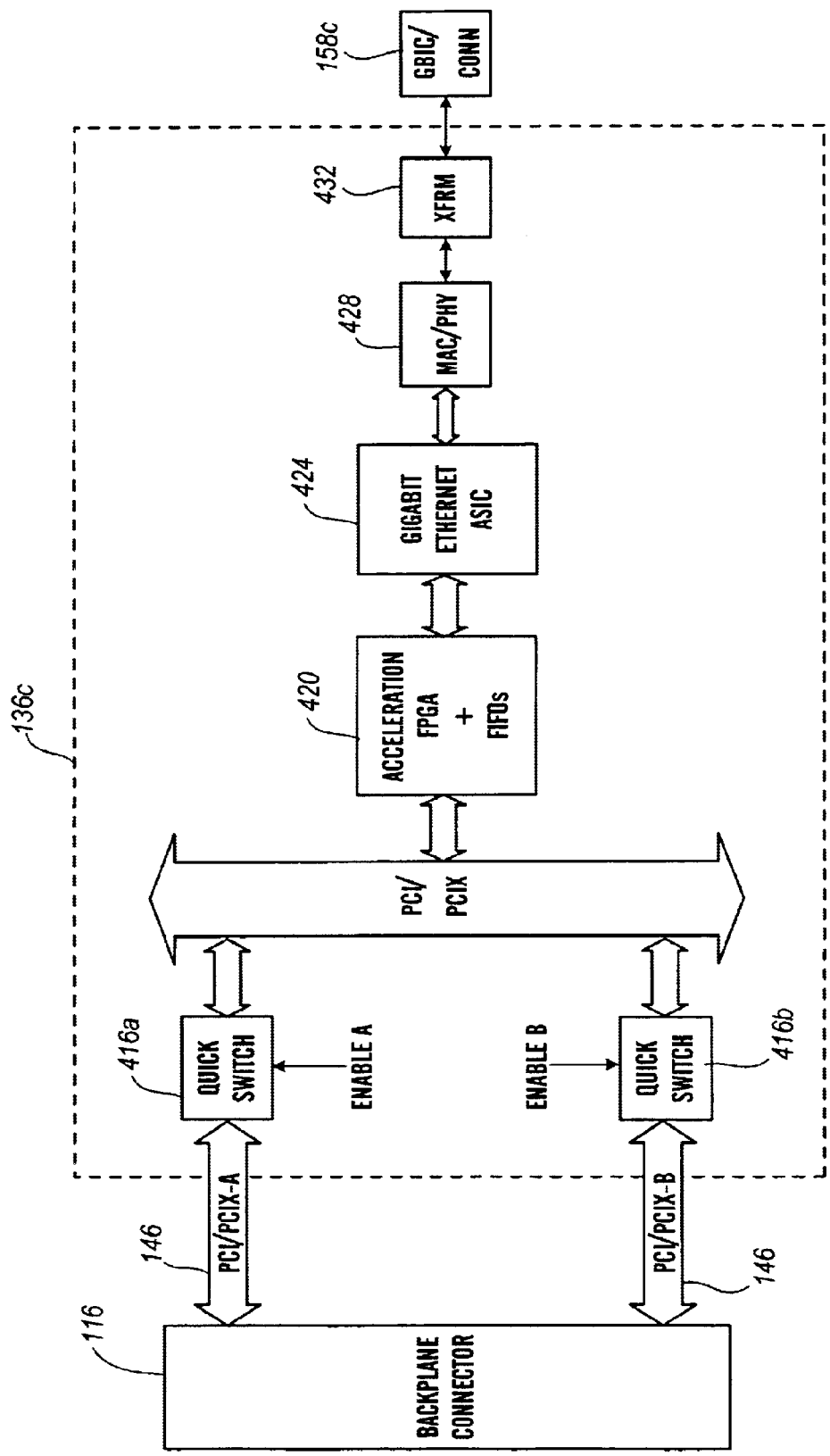
FIG. 11 is a block diagram representation of a network storage bridge utilizing a gigabit ethernet channel.

Referring now to FIGS. 9–11, several alternative embodiments of a CIM are shown to provide an example of the different configurations a CIM may have, and the different channel mediums a CIM may connect to. FIG. 9 shows a block diagram representation of a PCIX to gigabit interconnect (GBIC) configured CIM 136*a*. Within the CIM 136*a*, the switched/shared PCIX FPGA 200 connects to a dual port 2 Gb fiber channel interface 400. Each port of the dual port 2 Gb fiber channel interface 400 connects to a serializer/deserializer (SERDES) 404*a*, 404*b*. Each SERDES 404*a*, 404*b* connects to the channel medium using a 2 Gb fiber channel connection. In the embodiment shown in FIG. 9, one SERDES 404*a* connects to a GBIC host channel 152*a*, and the other SERDES 404*b* connects to a GBIC disk channel 158*a*.

FIG. 10 shows a block diagram representation of a PCIX to SCSI CIM 136*b*. Within the CIM 136*b*, the switched/shared PCIX FPGA 200 connects to a dual port Ultra320 SCSI interface 408. Each port of the dual port Ultra320 SCSI interface 408 connects to a host or disk channel, and also has a termination 412 connection, as is required for SCSI systems. In the embodiment shown in FIG. 10, one port of the dual port Ultra320 SCSI interface 408 connects to a very high density interconnect (VHDIC) host channel 152*b*, and one port of the dual port Ultra320 SCSI interface 408 connects to a VHDIC disk channel 158*b*.

FIG. 11 shows a block diagram representation of a PCIX to Ethernet CIM 136*c*, which employs quick switch connections 416*a*, 416*b* for use in the switched paths. The quick switch connections 416*a*, 416*b* are bus relays which contain enable inputs which act to enable and disable the quick switch connection 416*a*, 416*b*. Each quick switch connection 416*a*, 416*b* connects to an interface connection 420, which contains an acceleration FPGA and data FIFOs. The interface connection 420 connects to a gigabit Ethernet ASIC 424, which performs proper functions to the data to communicate the data over an Ethernet connection. The gigabit Ethernet ASIC 424 connects to a MAC/physical converter 428 which converts the signal to a physical signal, which is then routed to a transformer 432 to output the signal at the proper voltage. In one embodiment, the transformer 432 connects to a GBIC connection to a disk channel 158*c*. In the embodiment of FIG. 11, if a redundant system were required, shared paths would be provided on other CIMs. It will be appreciated that different channel mediums may be used in a single system using a combination of the different interface modules, such as those shown in FIGS. 9–11. For example, a host computer may connect to the network bridge using a fiber channel medium, and the network bridge may connect to a disk array using a SCSI channel medium.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. A network storage apparatus for connecting a host computer with at least one storage device, comprising:
   a passive backplane having a plurality of data buses including first and second data buses;
   at least first and second channel interface modules, connected to said passive backplane and adapted to be connected to the host computer and the at least one storage device, that are operational to send and receive storage data to and from the host computer and the at least one storage device and that are operational to selectively transfer the storage data to one or more of said plurality of data buses; and
   at least first and second controller memory modules, connected to said passive backplane, that communicate with said channel interface modules via said passive backplane, and that store and process the storage data transferred to and from said channel interface modules; wherein
   at least said first channel interface module has a first switched path and a second switched path in which said first switched path is enabled to connect said first switched path to said first controller memory module and in which said second switched path to said second controller memory module using said passive backplane is disabled.

2. The apparatus of claim 1, wherein:
   at least said first channel interface module includes a communication path portion and a channel interface portion, wherein said channel interface portion is operable to transfer the storage data between the host computer and/or the at least one storage device and said communication path portion, and said communication path portion is operational to selectively transfer the storage data between said channel interface portion and said passive backplane.

3. The apparatus of claim 2, wherein:
   said passive backplane further includes a third data bus and a fourth data bus;
   said first channel interface module includes a first bus port and a second bus port, and said second channel interface module includes a third bus port and a fourth bus port, said first, second, third and fourth bus ports being operable to connect said communication path portion to said passive backplane; and said first controller memory module includes a first bus interface and a second bus interface, and said second controller memory module includes a third bus interface and a fourth bus interface, said first, second, third and fourth bus interfaces being operable to connect said controller memory module to said first, second, third and fourth data buses of said passive backplane.

4. The apparatus of claim 3, wherein said first bus port is connected to said first data bus and said second bus port is connected to said third data bus;

said third bus port is connected to said second data bus and said fourth bus port is connected to said fourth data bus;

said first bus interface is connected to said first data bus and said second bus interface is connected to said second data bus; and said third bus interface is connected to said third data bus and said fourth bus interface is connected to said fourth data bus.

5. The apparatus of claim 4, wherein:

said communication path portion of said first channel interface module has a first shared path, a first switched path and a second switched path; and said communication path portion of said second channel interface module has a second shared path, a third switched path and a fourth switched path and in which:

said first shared path is connected to said first bus port and said second bus port;

said first switched path is connected to said first bus port and said channel interface portion;

said second switched path is connected to said second bus port and said channel interface portion;

said second shared path is connected to said third bus port and said fourth bus port;

said third switched path is connected to said third bus port and said channel interface portion; and said fourth switched path is connected to said fourth bus port and said channel interface portion; and wherein said first, second, third and fourth switched paths are operable to enable and disable communications involving said channel interface portion.

6. The apparatus of claim 1, wherein:

at least said first controller memory module includes a bus interface portion that connects to said passive backplane, a memory for temporary storage of said storage data, and a processing portion that organizes and arranges said storage data.

7. The apparatus of claim 6, wherein said bus interface portion includes:

at least one backplane interface that connects to said passive backplane;

a memory interface that connects to said memory;

a processing interface that connects to said processing portion;

a bridge core that contains control logic operable to connect said processing interface, memory interface and backplane interface; and at least one of an exclusive OR (XOR) engine that performs XOR functions on data blocks, and a direct memory access (DMA) engine that provides DMA access to said passive backplane.

8. The network storage apparatus of claim 1, wherein said passive backplane further includes:

third and fourth data buses, wherein said first channel interface module is connected to a first two of said data buses, and wherein said second channel interface module is connected to a second of two of said data buses.

9. The apparatus of claim 1, wherein each of said first and second data buses is part of a group of backplane buses and said group includes peripheral component interconnect (PCIX) buses.

10. The apparatus of claim 1, wherein:

said second switched path is enabled and said first switched path is disabled after a failure of said first controller memory module is detected using said second controller memory module.

11. A method for zoning a controller memory module to a channel interface module, comprising:

providing a first channel interface module having a first switched path and a second switched path;

connecting said first switched path to a first controller memory module using a passive backplane and said second switched path to a second controller memory module using said passive backplane;

enabling said first switched path;

disabling said second switched path;

sending data to said first controller memory module over said first switched path and said passive backplane, wherein said data is modified by said first controller memory module; and receiving modified data from said first controller memory module over said first switched path and said passive backplane.

12. A method for zoning a controller memory module to a channel interface module, comprising:

providing a first channel interface module having a first switched path and a second switched path;

connecting said first switched path to a first controller memory module using a passive backpack and said second switched path to second controller memory module using said passive backplane;

enabling said first switched path;

disabling said second switched path;

providing a second channel interface module having a third switched path and a fourth switched path;

connecting said third switched path to said first controller memory module using said passive backplane and said fourth switched path to said second controller memory module using said passive backplane;

enabling said fourth switched path; and disabling said third switched path.

13. The method of claim 12, further comprising:

detecting a failure of said second controller memory module using said first controller memory module;

discontinuing any use of said second controller memory module;

enabling said second switched path; and disabling said first switched path.

14. The method of claim 12, wherein said detecting comprises:

monitoring a heartbeat of said second controller memory module using said first controller memory module; and observing an irregularity in said heartbeat of said second controller memory module using said first controller memory module.

15. A method for zoning a controller memory module to a channel interface module, comprising:

providing a first channel interface module having a first switched path and a second switched path;

connecting said first switched path to a first controller memory module using a passive backplane and said second switched path to a second controller memory module using said passive backplane;

enabling said first switched path;

disabling said second switched path;

discontinuing any use of said second controller memory module, wherein said discontinuing includes;

transmitting a failure signal from said first controller memory module to said second controller memory module;

receiving said failure signal at said second controller memory module; and stopping operation of said second controller memory module.

16. A method for zoning a controller memory module to a channel interface module, comprising:

providing a first channel interface module having a first switched path and a second switched path;

connecting said first switched path to a first controller memory module using a passive backplane and said second switched path to a second controller memory module using said passive backplane;

enabling said first switched path;

disabling said second switched path;

detecting a failure of said first controller memory module using said second controller memory module;

incapacitating said first controller memory module;

enabling said second switched path; and disabling said first switched path.

17. A method for zoning a controller memory module to a channel interface module, comprising:

providing a first channel interface module having a first switched path and a second switched path;

connecting said first switched path to a first controller memory module using a passive backplane and said second switched path to a second controller memory module using said passive backplane;

enabling said first switched path;

disabling said second switched path;

providing a second channel interface module having a third switched path and a fourth switched path;

connecting said third switched path to said first controller memory module using said passive backplane and said fourth switched path to said second controller memory module using said passive backplane;

detecting a failure of said first channel interface module using said first controller memory module;

incapacitating said first channel interface module; and enabling said third switched path.

18. The method of claim 17, further comprising:

idling said first controller memory module.

19. The method of claim 17, wherein said detecting step includes:

performing run time diagnostics at said first channel interface module;

monitoring results of said run time diagnostics at said first controller memory module; and observing an irregularity in said results.

20. The method of claim 17, wherein said incapacitating step includes:

transmitting a failure signal from said first controller memory module to said first channel interface module;

receiving said failure signal at said first channel interface module; and discontinuing operations at said first channel interface module.

21. An apparatus in which a channel interface module is associated with a particular controller memory module, comprising:

at least a first channel interface module having a first switched path and a second switched path;

a passive backplane;

a first controller memory module connected to said first switched path using a first bus included in said passive backplane, said first controller memory module operable to form modified data received from said at least a first channel interface module over said first switched path and to return modified data to said at least a first channel interface module over said first switched path; and a second controller memory module selectively connected to said second switched path using a second bus included in said passive backplane, said second controller memory module operable to form modified data received from said at least a first channel interface module over said second switched path and to return modified data to said at least a first channel interface module over said second switched path, wherein a first one of said first switched path and said second switched path is disabled when a second one of said first switched path and said second switched path is enabled.

22. The apparatus of claim 21, wherein:

said second controller memory module detects a failure of said first controller memory module and is involved with disabling said first switched path and enabling said second switched path.

23. An apparatus in which a channel interface module is associated with a particular controller memory module, comprising:

at least a first channel interface module having a first switched path and a second switched path;

a passive backplane;

a first controller memory module connected to said first switched path using said passive backplane;

a second controller memory module disabled from said second switched path; and a second channel interface module having a third switched path and a fourth switched path and in which said second controller memory module is connected to said fourth switched path using said passive backplane while said third switched path is disabled.

24. The apparatus of claim 25, wherein:

said third switched path is enabled when a failure of said first channel interface module is detected using said first controller memory module.

* * * * *

UNITED STATES PATENT AND TRADEMARK OFFICE
CERTIFICATE OF CORRECTION

PATENT NO. : 6,839,788 B2
DATED : January 4, 2005
INVENTOR(S) : Victor Key Pecone It is certified that error appears in the above-identified patent and that said Letters Patent is hereby corrected as shown below:

Column 18,
Line 59, delete "25" and insert -- 23 -- therefor;

Signed and Sealed this

Twenty-sixth Day of April, 2005

JON W. DUDAS
*Director of the United States Patent and Trademark Office*